United States Patent [19]
Hebron et al.

[11] Patent Number: 6,101,228
[45] Date of Patent: Aug. 8, 2000

[54] RECEIVER OF WIDEBAND DIGITAL SIGNAL IN THE PRESENCE OF A NARROW BAND INTERFERING SIGNAL

[75] Inventors: Yoav Hebron; Sree A. Raghavan; Itzhak Gurantz, all of San Diego, Calif.

[73] Assignee: Conexant Systems, Inc., Newport Beach, Calif.

[21] Appl. No.: 08/861,669

[22] Filed: May 22, 1997

[51] Int. Cl.[7] .................................................. H03D 1/04
[52] U.S. Cl. ..................... 375/346; 375/235; 375/347; 375/206; 370/335
[58] Field of Search ................................. 375/346, 347, 375/206, 350, 344, 232, 345, 235; 370/335; 455/307, 503

[56] References Cited

U.S. PATENT DOCUMENTS

| | | | |
|---|---|---|---|
| 4,053,837 | 10/1977 | Ryan et al. ............................. | 375/235 |
| 5,268,927 | 12/1993 | Dimos et al. ........................... | 375/206 |
| 5,524,125 | 6/1996 | Tsujimoto ............................... | 375/347 |
| 5,646,964 | 7/1997 | Ushirokawa et al. ................... | 375/346 |
| 5,734,647 | 3/1998 | Yoshida et al. ......................... | 370/335 |

OTHER PUBLICATIONS

Bernard Widrow and Samuel D. Sterns, *Adaptive Signal Processing*, ©1985 by Prentice–Hall, Inc. Englewood Cliffs, N.J. 07632, pp. 99–101.

John G. Proakis, *Digital Communications*, ©McGraw Hill 1989, pp. 554–555, pp. 561–569.

*Primary Examiner*—Stephen Chin
*Assistant Examiner*—Shuwang Liu
*Attorney, Agent, or Firm*—Foley & Lardner

[57] ABSTRACT

A desired signal having a wide frequency band and including sequential symbols representing digital values is discriminated from a narrow band interfering signal having a carrier frequency in the wide band by initially applying both signals to a filter so both signals are passed to an output of the filter. In response to the filter output, estimates of the values of received symbols of the desired signal are derived and compared to the filter output to derive an error representing signal. A characteristic of the filter is controlled in response to the error representing signal so the filter is adjusted to reject the interfering signal and pass the desired signal.

5 Claims, 4 Drawing Sheets

RECEIVER OF WIDEBAND DIGITAL SIGNAL IN THE PRESENCE OF A NARROW BAND INTERFERING SIGNAL

FIELD OF INVENTION

The present invention relates generally to a method of and apparatus for receiving a signal from a wideband digital source in the presence of a narrow band interfering source, e.g. from a geosynchronous satellite in close arcuate proximity to another geosynchronous satellite and, more particularly, to such a method and apparatus wherein the receiver is responsive to signals from both sources and the desired signal is discriminated from the undesired signal by a spectral analysis even though the narrow band signal has substantial frequency components in the frequency band of the wide band source.

BACKGROUND ART

There are certain situations wherein a relatively wide band first signal containing digitally modulated symbols is desirably received in the presence of a relatively narrow band analog second signal occupying a frequency band that is in the wide frequency band of the first signal. For example, geosynchronous satellites containing transponders for C-band television emissions are typically spaced from each other by 2° of orbital arc and emit 5 to 10 watts. In the early to mid 1980's, a 120° K low noise block (LNB) downconverter was typical for terrestrial reception of analog television signals having video information frequency modulated on a C-band carrier emitted from the satellite. To bring the carrier to noise ratio (C/N) of the terrestrially received signals (typically about 11 dB) to acceptable levels, terrestrial antennas having parabolic reflector dishes with a 10' diameter were used. A 10' dish has a 3 dB beamwidth of 1.7° (i.e. the 3 dB power points of the antenna power pattern are 0.850 from the dish boresight axis); the pattern has a first null 2.3° from the dish boresight axis. Because the satellites are spaced 2° apart, the 10' diameter dishes protect against adjacent satellites by receiving the signals from the adjacent satellites on the low gain side lobes of the antenna pattern. Typically, the antenna gain of the side lobes of a good parabolic reflector dish and feedhorn coupled with the reflector is 18 dB below the boresight gain. Thus a high gain antenna automatically protects the desired signal coming from the satellite along the antenna boresight axis from interference from other adjacent satellite signals. Based on this reasoning C-Band satellites are placed 2° apart in the orbital arc.

Technology, however, has advanced to a point where, if only thermal noise were the dominating problem, the diameter of the reflector dish could be reduced. Consumer television receivers for receiving analog video signals are overdesigned to protect against interference from adjacent direct broadcast satellites. New technologies have led to development of much lower noise LNB's with noise temperatures as low as 25° K. For example, a 7' dish driving a LNB downconverter having a 40° K noise temperature has the same noise performance as a 10° dish driving a 120° K LNB downconverter.

However, satellites recently put into orbit or soon to be in orbit operate at maximum permissible power levels of 40 dB equivalent radiated power (EIRP) over most of the United States. When such a power level is factored into the C/N calculation it is found that a 4' diameter dish suffices for reception of analog C-Band f.m. video (C/N=10 dB). The 3 dB beamwidth of a 4' dish at C Band is 4.2°; the first null is 5.8° from boresight. Thus, the main lobe of an antenna having a 4' dish can span as many as four satellites that are 2° apart. Generally speaking, satellites which are 4° apart have identical frequency/polarization plans, leading to the possibility of significant interference from a satellite that is two positions away in the orbital arc from a satellite aligned with the dish boresight axis. This interference has not been conveniently filtered from the desired signal with a fixed parameter filter. This is true even though the spectrum of the unwanted signal is specified only as being in the bandwidth of the desired signal.

The United States Federal Communications Commission frequency/polarization plan requires satellite transponders having adjacent center frequencies on satellites 2° apart to emit radiation having the same polarization. Since signals from these identically polarized transponders can and do overlap in frequency, signals from adjacent satellites also interfere with each other when they are both received by an antenna having a relatively wide beamwidth. Such an interfering signal cannot be conveniently filtered from the desired signal.

A conclusion that can be drawn from C-band transmission of analog video is that if thermal noise, rather than interference were the governing consideration, a smaller dish would be feasible. This conclusion has even greater validity for direct satellite broadcasting of digital video signals. Professional grade satellite C-band f.m. video receivers have an i.f. bandwidth of 30 MHz. In various scenarios the information rate of digital video relayed through a satellite transponder is 30 Mb/s. If the LNB, antenna size and satellite EIRP are equal for 30 Mb/s digital video and 30 MHz f.m. analog video signals, the carrier to noise ratio (C/N) for the analog case equals energy per bit ($E_b/N_0$) for the digital case; $E_b/N_0$ is a measure of noise density and thus is similar to signal to noise ratio (S/N) of an analog signal. However the $E_b/N_0$ required for satellite transmission of C-band f.m. video, assuming concatenated forward error correction coding consisting of a Reed Solomon coder and a high rate convolutional encoder, is 5.5 dB, not 11 dB, as is typical of the C/N for analog video. By applying the increased margin to dish diameter, a 4' dish can be reduced to a 2.4' dish, if thermal noise were the only consideration. Of course, the smaller dish provides even less spatial discrimination against adjacent satellites so interference from other satellites becomes more of a problem.

Small diameter dishes are important because they increase the number of potential terrestrial installations (particularly homes) of receivers for direct satellite broadcasting via digital modulation. A current K-band DBS (direct broadcast satellite) system is viable because it employs a one-and-a-half foot (i.e. about 0.5 meters) diameter dish that is unobtrusive, has low wind resistance and provides acceptable reception. A C-Band DBS (Direct Broadcast Satellite) service is expected to be more profitable and certainly viable in areas having small receiver dish diameters because fixed costs thereof are spread over a base of cable subscribers and residences having consumer television receivers responsive to signals derived from a down link having digital modulation.

A proposed solution to reduce interference is to increase the 2° spacing between adjacent satellites. This does not seem to be feasible or likely. Hence, the interference problem between signals from adjacent satellites is most acute for C-band digital television. A technical solution is preferable to a political solution because it does not require coordination between satellite operators or compromises between the organizations involved.

An interference situation similar to that of small diameter dishes responsive to adjacent satellites can also exist for: (1) quadrature amplitude modulation (QAM) cable transmission of video wherein it is desirable for (a) a wide band digitally modulated signal containing television broadcast information and (b) a narrow band analog signal containing television broadcast information to occupy the same frequency band on the same cable conductors, and (2) terrestrial transmission through the air of (a) multilevel vestigial sideband high definition television information having a relatively wide bandwidth and (b) a narrow bandwidth analog television broadcast signal that is in the same frequency band as the high definition wide bandwidth information.

SUMMARY OF THE INVENTION

It is accordingly an object of the present invention to provide a new and improved method of and apparatus for receiving a wideband digital signal in the presence of a narrow band interfering signal wherein the narrow band signal occupies a part of the same bandwidth as the wideband signal and has a variable center frequency.

Another object of the present invention is to provide a new and improved method of and apparatus for receiving a desired signal from a geosynchronous satellite having close arcuate spacing with another geosynchronous satellite, wherein one of the satellites emits narrow band electromagnetic energy that occupies a part of a wide frequency band of electromagnetic energy of a desired signal, emitted from another satellite, wherein the energy from both satellites is incident on an antenna dish having a beamwidth large enough to receive electromagnetic energy from both satellites.

DESCRIPTION OF THE INVENTION

In accordance with one aspect of the invention, a desired wide band signal having a predetermined carrier frequency and including sequential symbols representing digital values is discriminated from a narrow band interfering signal having a carrier frequency in the wide band by initially applying both of the signals to a filter so both signals are passed to an output of the filter. In response to the filter output an estimate of the symbol value of the desired wideband signal is derived and compared with the filter output to derive an error representing signal. A characteristic of the filter is controlled in response to the error representing signal to adjust the filter to reject the interfering signal and pass the desired signal.

In a preferred embodiment, the filter includes multiple cascaded delay elements that are responsive to the symbols so the delay elements contain values representing the amplitudes of successive received symbols. An electronic device combines signal values representing the values in the elements with signal values representing the errors to derive an output signal for each of the delay elements. An electronic device combines values representing the output signals of each delay element to derive the filter output.

In one embodiment, the desired signal includes orthogonal I and Q channels, which include sequential symbols resulting from simultaneous I and Q components. The filter includes multiple delay intervals. In the filter, the I and Q components are delayed by multiple successive equal time intervals equal to an integral multiple of the interval between adjacent symbols. In the illustrated embodiment, the amplitude of each symbol is sampled once so the multiple is one. However, the invention is not so limited and there can be two or even more samples per symbol; if there are two samples per symbol the multiple is two, etc. for larger numbers of samples per symbol. Signals determined by the sampled amplitudes of the delayed I and Q components, as delayed for corresponding times, and signals representing the values of the I and Q errors are outputs of 78–78.6 combined to derive an I and a Q output signal for each of several delay intervals. The I output signals for each of the several delay intervals are combined as are the Q output signals for each of the several delay intervals. The I errors are derived by responding to the combined I output signals and the I estimates while the Q errors are derived by responding to the combined Q output signals and the Q estimates.

In accordance with another aspect of the invention, there is provided a method of terrestrially receiving a first electromagnetic wave having a predetermined bandwidth emitted from a first geosynchronous satellite that is spaced from a second geosynchronous satellite by a predetermined relatively small arc. The second geosynchronous satellite emits a second electromagnetic wave having (a) a narrower bandwidth than the first wave, (b) frequency components in the bandwidth of the first wave, and (c) a carrier frequency that is subject to change. The first and second waves are simultaneously emitted by the first and second satellites.

The method comprises simultaneously transducing the first and second waves into first and second simultaneously derived electrical signals that are replicas of variations of the waves. The waves are transduced by a terrestrial antenna pointed generally at the first satellite and having a beamwidth for receiving the first and second waves with about the same amplitude. In response to the first and second signals, the second signal is substantially attenuated relative to the first signal so the first signal is passed to an output device. The output device produces a perceptible output in response to the first signal and fails to produce a perceptible output in response to the second signal. The substantial attenuation of the second signal is preferably provided by discriminating its bandwidth from that of the first signal.

In accordance with another aspect of the invention, there is provided an apparatus for receiving wideband emissions from a first geosynchronous satellite in the presence of narrow band emissions from a second geosynchronous satellite having a relatively close arcuate spacing from the first satellite. The wide band and narrow band emissions are capable of having overlapping spectra and the narrow band emission has a carrier frequency subject to change. The apparatus comprises an antenna having a beamwidth such that emissions from the first and second satellites are respectively transduced into first and second simultaneously occurring electrical signals having approximately the same amplitude. An adaptive filter responsive to the first and second electrical signals substantially attenuates the second signal relative to the first signal so the first signal, as coupled to an output terminal of the filter, has an amplitude that can produce a perceptible response in an output device and the second signal, as coupled to the output terminal, has an insufficient amplitude to produce a perceptible response in the output device.

Preferably the filter includes means responsive to the first and second signals for passing most frequencies in the bandwidth of the first signal and for substantially attenuating substantially all frequencies in the bandwidth of the second signal. The means for passing and substantially attenuating preferably performs a statistical analysis, based on minimum least mean square error techniques, of the symbols included in the filter output signal and the first input signal.

The means for passing and substantially attenuating preferably includes a delay line having multiple taps on which are derived signals that are combined to provide the filter output. Signal processing means controls the amplitude of signals derived from the taps that are combined.

An embodiment of the present invention uses adaptive optimal linear filtering to reject unwanted interference within the bandwidth of the desired signal. The unwanted interference frequently has a carrier frequency subject to variation, such that the interference is subject to having a carrier frequency that moves back and forth across the spectrum of the desired signal. The bandwidth of the unwanted interference may be as great as 25 percent of the bandwidth of the desired signal. The interference can be from a coherent or incoherent source and is considered to be a quasi stationary process. It is necessary for the filter, which is based on the minimum least mean square error principle, to be adaptive because of the tendency of the carrier frequency of the interference to vary relative to the frequency of the desired signal.

The specific adaptive optimum linear filter is similar to a prior art filter disclosed by Proakis in the book *Digital Communications,* 2nd Edition, McGraw-Hill 1989. The filter disclosed by Proakis is known to reduce intersymbol interference in band limited channels, in particular to reduce the adverse effects of reflections in terrestrial television transmission. The present invention recognizes that signal processing structures similar to those disclosed by Proakis can be employed to discriminate against interference from interfering sources having spectral content as described above. In the application of the present invention, the adaptive linear filter is forced to converge to a filter that minimizes the mean squared error between the output of the filter and the desired signal.

Embodiments of the invention are most ideally suited for reception of phase shift key signals containing television programming information as emitted from a direct broadcast satellite in geosynchronous orbit; the phase shift key modulation can be of any form, particularly quadrature phase shift key and bi-phase shift key. The invention can also be employed in connection with cable networks, wherein a quadrature amplitude modulated (QAM) signal having a wide bandpass and containing digitally modulated television broadcast information and conventional television broadcast signals containing analog video share portions of the same bandwidth. The QAM modulation can be of any of the recognized forms, including the 64- and 256- ary forms. The invention can also be employed in situations wherein conventional terrestrial analog television broadcast information shares a portion of the bandwidth of a terrestrial multi-level vestigial sideband signal proposed for high definition television broadcast.

Because the spectrum of the desired signal differs from that of the interference, a linear filter designed to respond to an error between the output of the filter and a true value of the signal causes the error to be driven to the lowest value achievable to provide an acceptable signal to noise ratio gain. This is because the filter optimally discriminates against the interference on the basis of the frequency of the interference. In essence, the adaptive linear filter creates narrow band frequency notches to substantially reduce the energy of the interfering signal, as coupled to the filter output.

The filter must be provided with the true value of a transmitted signal or a surrogate of the desired signal that is close to the true value of the transmitted signal. Thus, either a known signal is transmitted while the filter is in a training mode or the filter must be able to estimate the desired signal with a reasonable level of confidence. The filter is in a training mode when parameters thereof are being modified to enhance interference rejection. If the filter is responsive to a television signal from a direct broadcast satellite, in which case a training signal cannot be employed, the desired signal may be stronger than the interference or may differ from the interference in modulation format or carrier frequency or both. Therefore, a hard decision based on the output of the filter and on operator knowledge of the characteristics of the desired signal should be close enough to the desired signal to provide training for the adaptive filter.

Hence, the present invention is concerned with an adaptive filter to reject in-band interference due to other signal sources. Many alternatives for the configuration of the filter and for the process to set the filter parameters are possible. However, any adaptive process for controlling the filter must be supplied with a replica of the desired signal that is close to being correct during a period when the parameters of the filter are being modified.

In the preferred embodiment, the adaptive interference rejection filter is configured so it has a finite impulsive response having values corrected after a hard decision has been made for each transmitted channel symbol. The adaption method is known as the Widrow Hoff least mean square algorithm, disclosed in the book *Adaptive Signal Processing* by Widrows et al. A description of this technique in the context of adaptive equation is provided in Proakis, ibid.

The above and still further objects, features and advantages of the present invention will become apparent upon consideration of the following detailed description of a specific embodiment thereof, especially when taken in conjunction with the accompanying drawings.

DESCRIPTION OF THE PREFERRED EMBODIMENT

Figure 1:
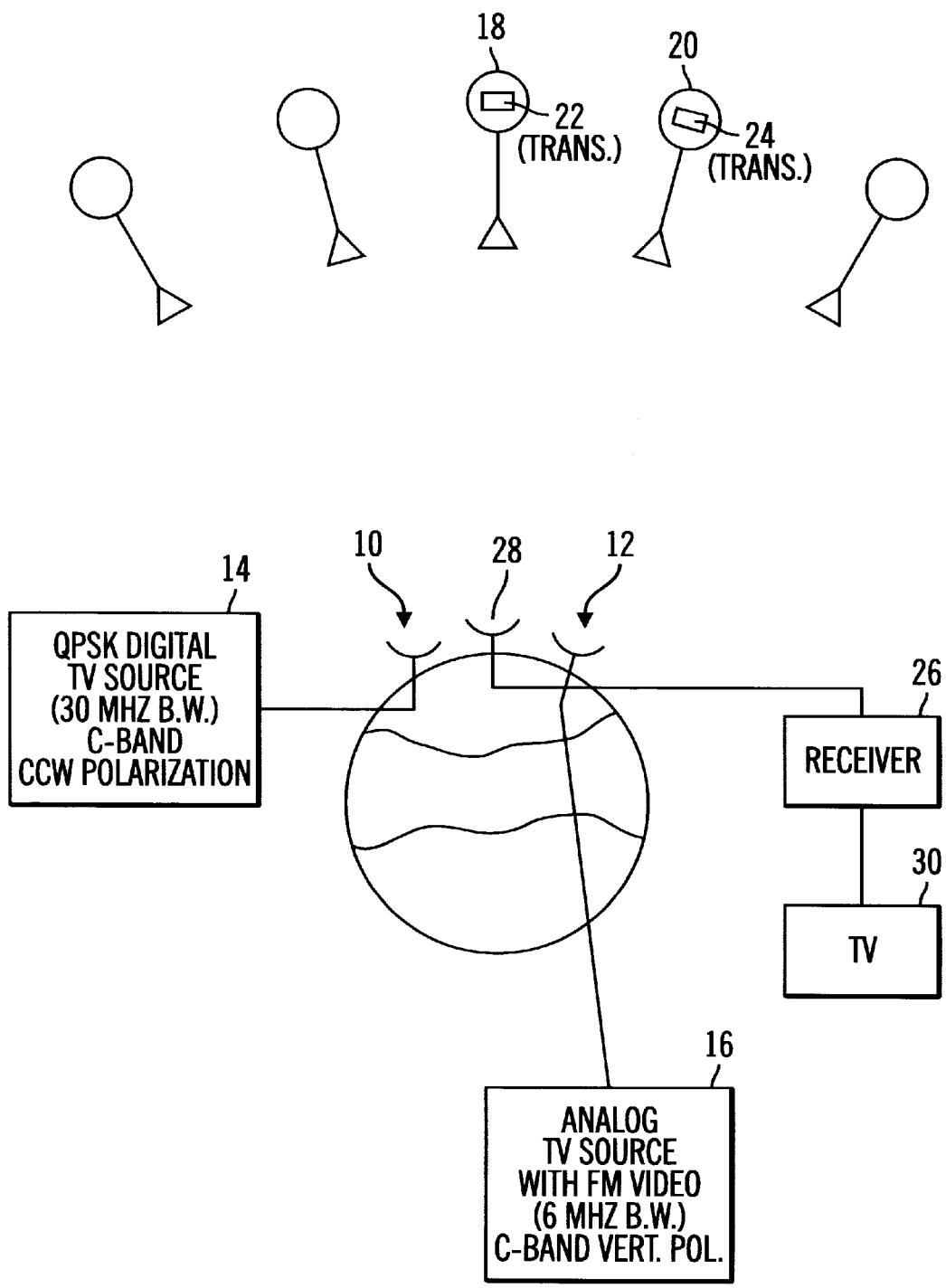
FIG. 1 is an overall view of a system including the present invention and sources of interfering signals.

Reference is now made to FIG. 1 of the drawing wherein the surface of the earth is depicted as including satellite uplink C-band transmitters 10 and 12. Transmitter 10 is responsive to digital television program broadcast source 14 having a relatively wide bandwidth, typically 30 MHz. Program source 14 is phase shift key modulated, preferably quadrature or bi-phase shift key modulated. In a preferred embodiment, source 12 employs forward correction error techniques and is of a type disclosed in the U.S. Pat. No. 5,438,590, the subject matter of which is incorporated by reference herein. Transmitter 12 is responsive to analog television broadcast source 16 of a conventional type, including FM video having a 6 MHz bandwidth.

The signals of uplink transmitters 10 and 12 are respectively aimed at geosynchronous satellites 18 and 20, respectively including transponders 22 and 24. Satellites 18 and 20 are in earth orbit, being spaced from each other by 2° of arc relative to the center of the earth. Transponders 22 and 24 respectively respond to emissions from transmitters 10 and 12 to radiate C-band replicas of the signals incident thereon to a relatively large terrestrial geographic area, such as the continental United States, southern Canada and the Caribbean. Hence, transponder 22 emits a replica of the phase shift key wideband digital television program derived from source 14, while transponder 24 emits a replica of the relatively narrow band analog television program from source 16. The emissions from transponders 22 and 24 are typically in the 5 to 10 watt range and the carrier frequency of the emission from transponder 24 can be in the spectrum of the C-band signal emitted from transponder 22. The carrier frequency of the emission from transponder 24 is subject to change relative to the center frequency of the emission from transponder 22, such that the spectrum emitted from transponder 24 can vary. The signals emitted by transponders 22 and 24 can have the same polarizations, although it is preferable for them to be different, as is usually the case.

Receiver 26, having a low noise block (about 40° K) and driven by antenna 32, including parabolic antenna reflector dish 28, is located at a site on the surface of the earth. Reflector dish 28 has a relatively small diameter of approximately 18 inches, i.e., approximately 0.5 meter. Antenna 32 is arranged to be responsive to the polarization of the electromagnetic energy emitted from transponder 22 of satellite 18, at which the boresight axis of dish 28 is pointed. Because reflector 28 has a small diameter, the reflector has a low gain and wide beamwidth main lobe such that the energy transduced by antenna 32 has approximately the same amplitude for the wideband signal emitted by transponder 22 as for the narrow band energy emitted from transponder 24, i.e., the antenna derives first and second signals that are respectively substantial replicas of the energy from transponders 22 and 24, wherein the first and second signals have the same order of magnitude. The beamwidth of antenna 32 including reflector 28 is approximately 4.8°, i.e., there is an angle of approximately 2.4° between the three dB points of the antenna main lobe and the antenna boresight axis response.

Because antenna 32 transduces the electromagnetic energy from transponders 22 and 24 into first and second electrical signals having somewhat the same amplitude, receiver 26 must employ a filter capable of eliminating the interfering effects of the emissions from transponder 24 on the signal picked up by the antenna from transponder 22. The filter must be adaptive because the carrier frequency derived from transponder 24 is variable with respect to the center frequency of the spectrum emitted by transponder 22.

In a preferred embodiment, receiver 26 includes front end circuitry for deriving baseband signals and an all digital demodulator, preferably of a type described in co-pending U.S. patent application Ser. No. 07/998,300, filed Dec. 30, 1992, corresponding with PCT application PCT/US93/12613, published Jul. 21, 1994, incorporated by reference herein. In addition, receiver 26 includes output circuitry as described in the previously mentioned application Ser. No. 08/065,292.

Receiver 26 also includes an adaptive filter responsive to the C-band signals incident on the antenna including parabolic reflecting dish 28, as derived from transponders 22 and 24. The adaptive filter passes most of the wide band signal from transducer 22 while substantially attenuating most of the energy from transponder 24 so television receiver 30 derives a perceptible television broadcast signal in response to the signal from transponder 22 to the exclusion of the signal from transponder 24.

Figure 2:
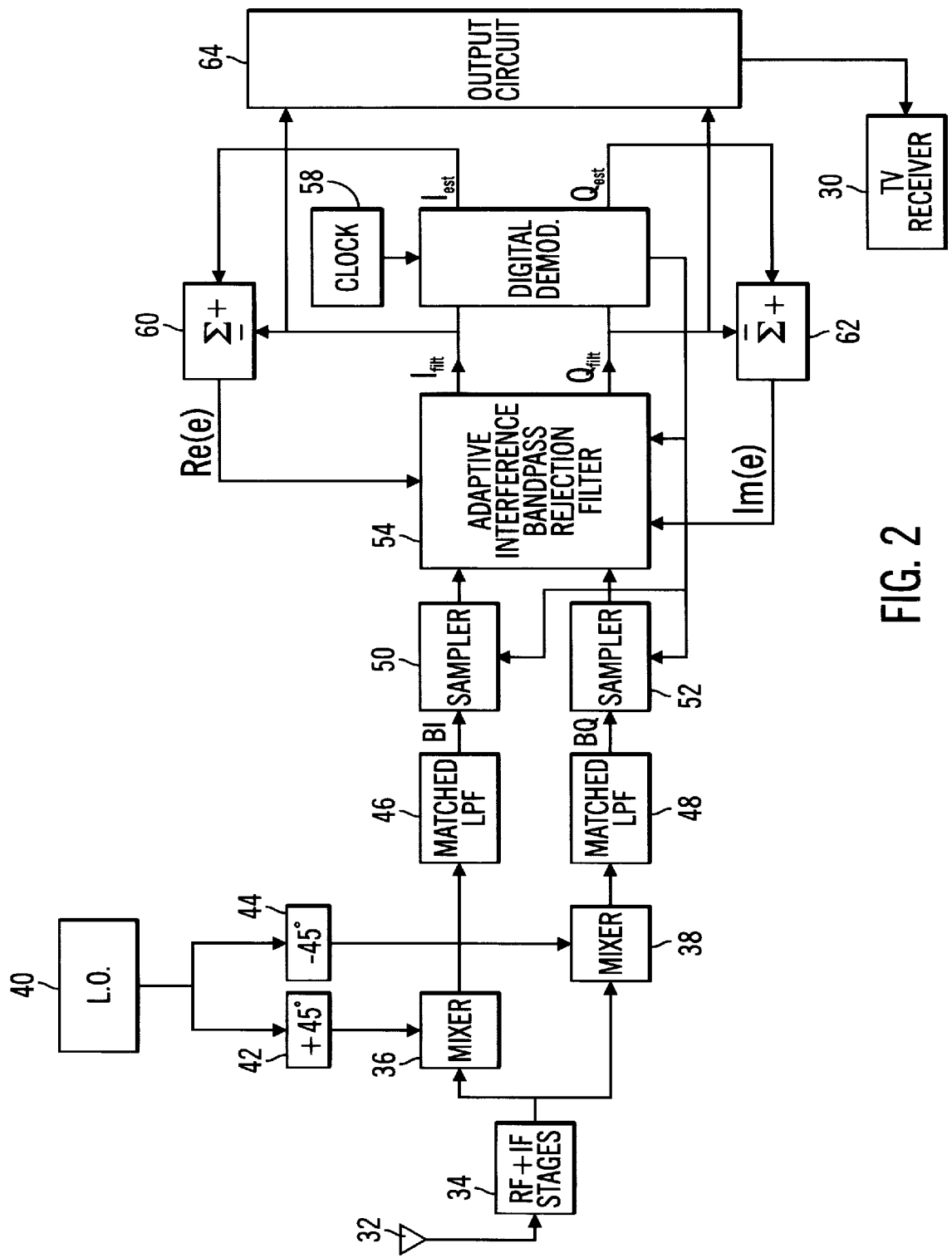
FIG. 2 is a block diagram of a receiver including the present invention.

To these ends, the preferred embodiment of receiver 26, as illustrated in FIG. 2, includes antenna 32 containing dish 28. Antenna 32 derives a C-band signal which is amplified and heterodyned to an i.f. frequency by r.f. and i.f. stages 34. Stages 34 thereby derive an i.f. output signal containing quadrature phase shift key (QPSK) symbols that are beat by mixers 36 and 38 to baseband I and Q components. Mixers 36 and 38 are respectively driven by orthogonally phased outputs of open loop local oscillator 40 via +45° and −45° phase shifters 42 and 44. The I and Q output baseband components of mixers 36 and 38 are respectively supplied to matched low pass filters 46 and 48, in turn having baseband I and Q output components that are respectively supplied to amplitude sampling circuits 50 and 52. Sampling circuits 50 and 52, preferably low cost analog to digital converters, sample the output components of filters 46 and 48 once during each symbol of the signal received by antenna 32 from transponder 22. It is to be understood, however, that sampling can be at plural tines during each symbol, although such apparatus adds materially to the cost of receiver 26.

Each of samplers or converters 50 and 52 derives a multibit output signal, such that one bit represents the polarity of the components supplied to the input of the sampler and the remaining bits approximate the amplitude of the input of the samplers. The digital output signals of samplers 50 and 52 are supplied to adaptive interference bandpass rejection filter 54 which passes most of the wideband energy from transponder 22 to the exclusion of a substantial portion of the narrow band energy from transponder 24. This result is provided even though the energy from transponder 24 has a carrier frequency in the bandwidth of the energy from transponder 22 and the carrier frequency of the energy from transponder 24, as incident on antenna 32, is subject to change. Details of filter 54 are described infra in connection with FIGS. 3 and 4. Filter 54 responds to input signals supplied to it to derive multibit digital output signals $I_{filt}$ and $Q_{filt}$; in steady state, $I_{filt}$ and $Q_{filt}$ respectively represent the in-phase and quadrature-phase components of the QPSK signal derived from transponder 22, without the interfering effects of the analog, narrow band components from transponder 24. Initially, the $I_{filt}$ and $Q_{filt}$ signals have values representing in-phase and quadrature phase components of the first and second signals and noise from both of transponders 22 and 24.

The $I_{filt}$ and $Q_{filt}$ output signals of bandpass rejection filter 54 are supplied to digital demodulator 56, preferably of the type described in U.S. Pat. No. 5,550,869. Digital demodulator 56 responds to clock source 58, as well as the $I_{filt}$ and $Q_{filt}$ signals to derive multibit output signals $I_{est}$ and $Q_{est}$, respectively estimates of the values of $I_{filt}$ and $Q_{filt}$ derived from transponder 22. In addition, digital demodulator 56 derives a timing output signal to control when samplers 50 and 52 are to be responsive to the amplitudes of the output signals of matched low pass filters 46 and 48.

Multibit digital signals commensurate with the errors between the estimates $I_{est}$ and $Q_{est}$, as derived from digital demodulator 56, and the $I_{filt}$ and $Q_{filt}$ outputs of bandpass rejection filter 54 are respectively derived by digital summing circuits 60 and 62. To these ends, each of summing circuits 60 and 62 is, in actuality, a subtraction circuit since each has a negative input and a positive input, such that the negative inputs of summing circuits 60 and 62 are respectively responsive to $I_{filt}$ and $Q_{filt}$, while the positive inputs of the summing circuits are responsive to $I_{est}$ and $Q_{est}$. Summing circuits 60 and 62 thereby respectively derive error output signals Re(e) and Im(e) in accordance with:

$$Re(e)=I_{est}-I_{filt} \quad (1) \text{ and}$$

$$Im(e)=Q_{est}-Q_{filt} \quad (2).$$

Hence, the output signals of summing circuits 60 and 62 respectively represent the real (in phase) and imaginary (quadrature phase) error components; the Re(e) and Im(e) output signals of summing circuits 60 and 62 are supplied to further inputs of adaptive bandpass rejection filter 54.

Adaptive interference bandpass rejection filter 54 responds to the I, Q, Re(e) and Im(e) signals supplied to it to derive signals $I_{filt}$ and $Q_{filt}$. In the illustrated embodiment, filter 54 delays the I and Q channel symbols derived by samplers 50 and 52 for seven symbol ties, but it is to be understood that a filter having any suitable number of integral delay times can be employed. At each delayed symbol time the delayed I and Q channel symbols are combined with signals indicative of the errors between actual outputs of the filter and estimates of the values of the I and Q channels. The delayed symbols and the errors are combined into filter characteristics in such a way that the signal from transponder 24 is substantially attenuated relative to the signal from transponder 22.

Signals $I_{filt}$ and $Q_{filt}$, which at symbol time k have values $I_{filtk}$ and $Q_{filtk}$, are derived in accordance with:

$$I_{filtk} = \sum_{i=0}^{n} [p_k^i Re(coeffi)_k - q_k^i Im(coeffi)_k] \quad (3)$$

$$Q_{filtk} = \sum_{i=0}^{n} [q_k^i Re(coeffi)_k - p_k^i Im(coeffi)_k] \quad (4)$$

where:

k is the time the kth symbol is supplied by samplers 50 and 52 to filter 54, n is one less than the number of stages in each of the tapped delay lines in filter 54 which are responsive to the symbols derived by samplers 50 and 52, i is selectively 0,1 . . . n, $P_k^i$ is the output of stage i of the delay line in filter 54 responsive to sampler 50 for the symbol supplied to the filter at time k, $q_k^i$ is the output of stage i of the delay line in filter 54 responsive to sampler 52 for the symbol supplied to the filter at time k, $$Re(coeffi)_{k+1}=Re(coeffi)_k+d[Re(e)_k p_k^i+Im(e)_k q_k^i] \quad (5)$$

$$Im(coeffi)_{k+1}=Im(coeffi)_k+d[Im(e)_k p_k^i-Re(e)_k q_k^i] \quad (6)$$

d is a scaling factor to adjust the rate of change of coefficients $Re(coeff_k)$ and $Im(coeff_k)$; (typically d is about 0.001).

The $I_{filtk}$ and $Q_{filtk}$ output signals of filter 54 are supplied to output circuitry 64, preferably configured to include a puncturing decoder, Viterbi decoder, deinterlever, Reed-Solomon decoder, channel selector, decompressor and remodulator, as described in the aforementioned application Ser. No. 08/065,292. Circuit 64 derives a conventional television signal including video and audio components for driving television receiver 30.

Figure 3:
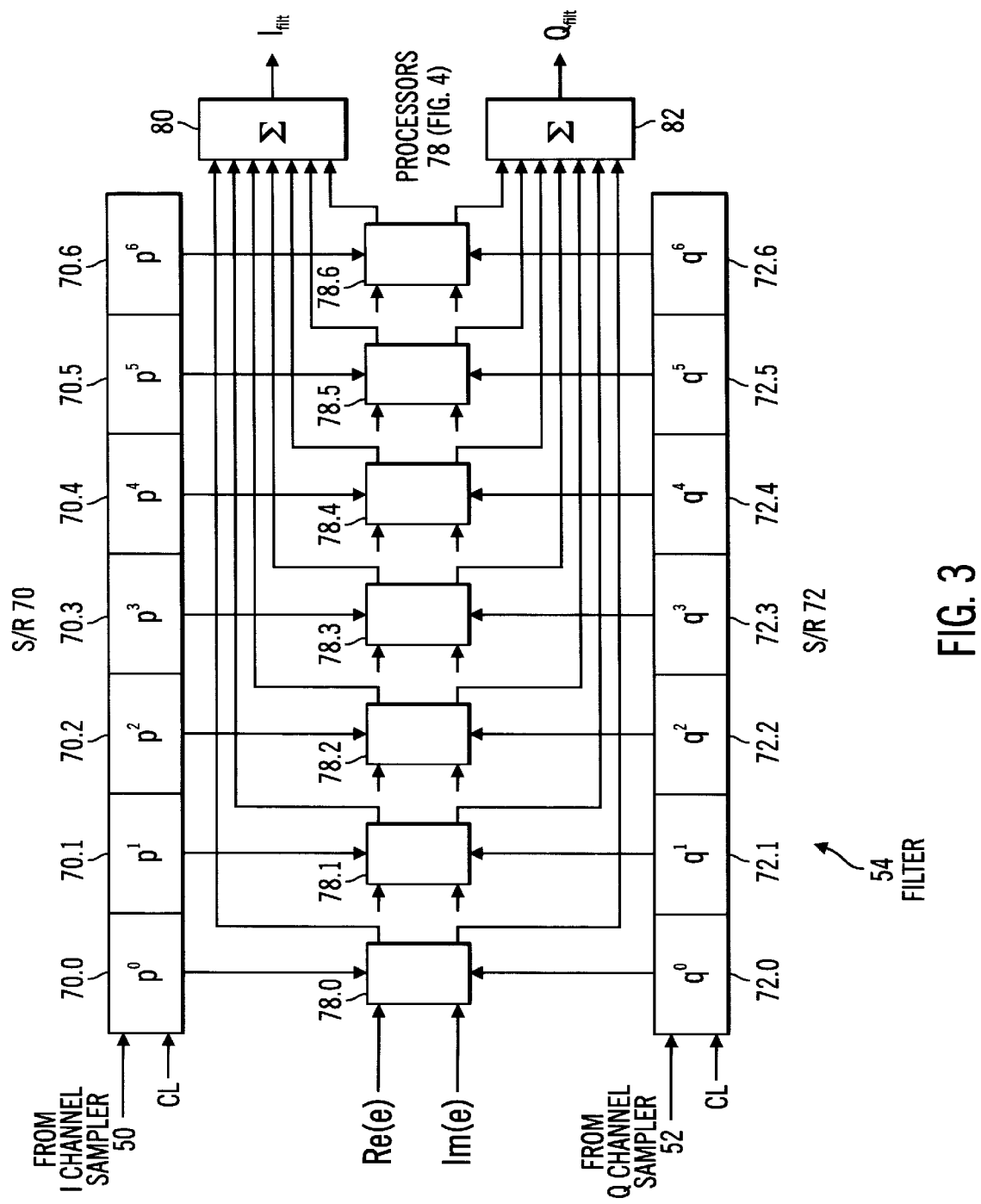
FIG. 3 is a block diagram of the adaptive filter illustrated in FIG. 2.
Figure 4:
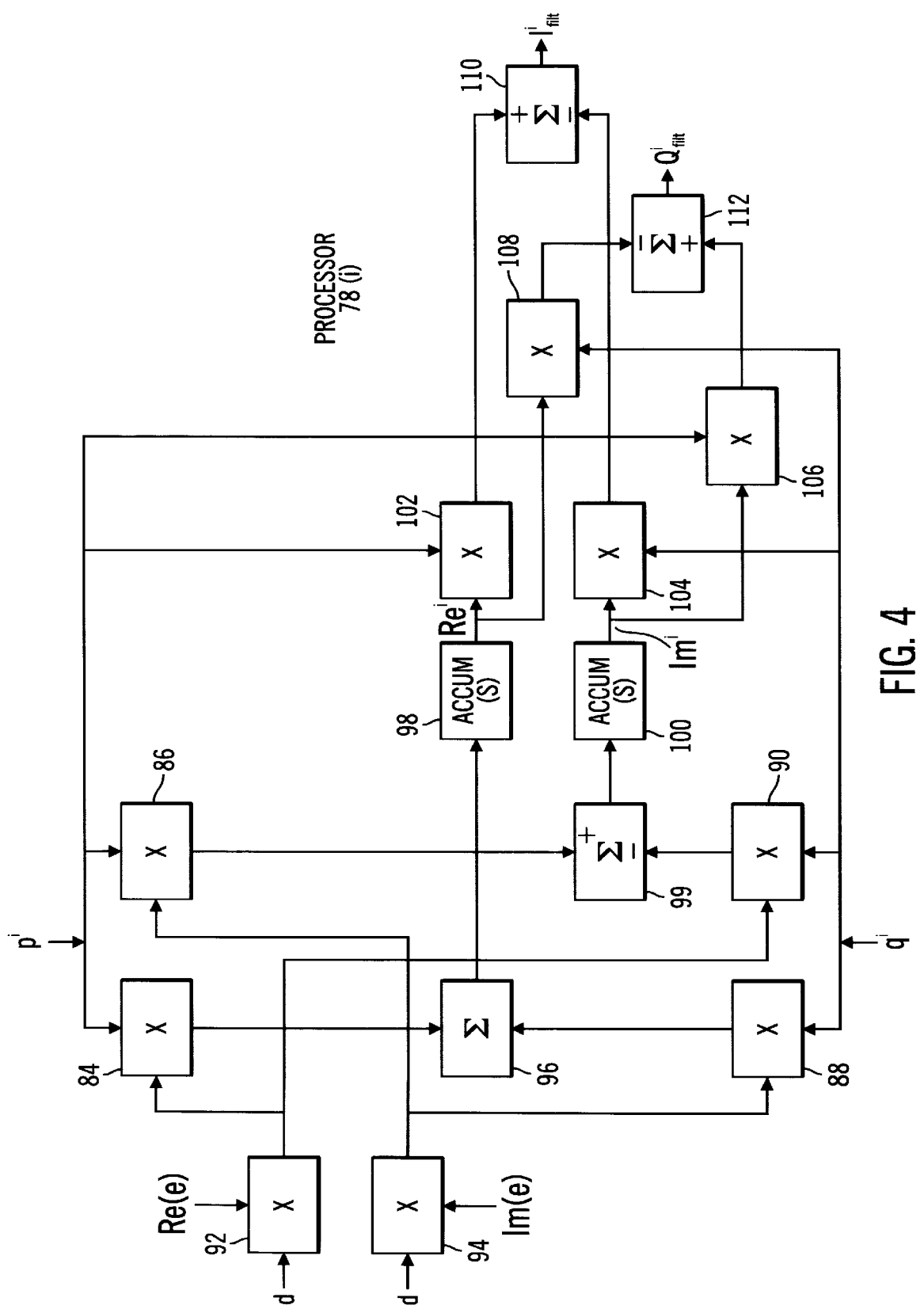
FIG. 4 is a block diagram of processing circuitry included in a part of the filter illustrated in FIG. 3.

Block diagrams of the apparatus for solving the aforementioned equations and of the circuitry included in filter 54 are illustrated in FIGS. 3 and 4. The apparatus illustrated in FIGS. 3 and 4 is for a single bit of the multibit signals applied to filter 54. It is to be understood that additional circuitry (not shown) is provided for each bit and that conventional carry circuitry (not shown) is also employed, as necessary.

As illustrated in FIG. 3, filter 54 includes two non-recirculating shift registers 70 and 72, each of which effectively functions as a tapped delay line responsive to the I and Q channel output symbols of samplers 50 and 52. Each of registers 70 and 72 has seven stages 70.0–70.6 and 72.0–72.6 and a clock input responsive to the timing output signal of demodulator 56 that is also applied to samplers 50 and 52. The timing output signal of demodulator 56 causes the signals in shift registers 70 and 72 to be shifted from one stage to the next stage once during each symbol applied to and derived from samplers 50 and 52. While each of shift registers 70 and 72 preferably includes seven stages, it is to be understood that the shift registers can include any like number (n+1) of stages. Shift registers 70 and 72 have data input terminals respectively responsive to the I and Q output symbols of samplers 50 and 52. Thereby, during successive time intervals (k) stage (i) of shift register 70 has dwelling therein a bit $p_k^i$ derived from sampler 50 at symbol time (k–i), where i is selectively each of 0–6; hence, the signal in stage i of shift register 70 can be represented as $p^i$. Similarly, bit $q_k^i$ in stage i at time k of shift register 72 is derived by sampler 52 at symbol time (k–i).

The signals at time k in like numbered stages (i) of shift registers 70 and 72 and signals indicative of the real and imaginary error components at time (k), as represented by $Re(e)_k$ and $Im(e)_k$, are combined in seven different processors 78.0–78.6 in accordance with $$I_k^i=p_k^i Re(coeffi)_k-q_k^i Im(coeffi)_k \quad (7)$$

$$Q_k^i=q_k^i Re(coeffi)_k+p_k^i Im(coeffi)_k \quad (8).$$

Hence, a particular one (i) of processors 78 derives output signals $I_k^i$ and $Q_k^i$. The $I_k^i$ output signals of the seven processors 78 are added together in digital summing circuit 80, which derives output signal $I_{filtk}$ in accordance with Equation (3) while the $Q_k^i$ output signals of the seven processors 78 are combined in digital summing circuit 82, which derives output signal $Q_{filt}$ in accordance with Equation (4).

Initially, each of accumulators 78 is loaded so a binary 1 is in the center stage 70.3 and the remaining processors 78 have binary 0's loaded therein. Hence, initially the value of $p^3$ is one and the remaining values of $p^i$ and all of the values $q^i$ are zero. Since it is not practical to apply a training signal to shift registers 70 and 72 or processors 78 in a commercial television situation, these initial values in processors 78 are combined in accordance with Equations (3) and (4) to provide initial values of $I_{filtk}$ and $Q_{filtk}$ that result in values of Re(e) and Im(e) that are combined with the first symbols derived from samplers 50 and 52 after turn-on of the equipment. Because of the binary zero values in all of processors 78 except for the center processor real value $p^3$, and the relatively low value of d=0.001 that is applied as a multiplication factor to the Re(e) and Im(e) error signals, the entire spectrum of the I and Q output signals of samplers 50 and 52 is initially passed through filter 54 as output signals $I_{filt}$ and $Q_{filt}$.

In response to the first symbol values derived by samplers 50 and 52, digital demodulator 56 derives I and Q channel signals representing estimates of the actual desired information. The estimates of the actual desired information are compared with the actual received signal, as derived from filter 54 as signals $I_{filt}$ and $Q_{filt}$; the comparisons are performed in summing circuits 60 and 62 which derive the error representing signals Re(e) and Im(e). This error information is supplied back to filter 54 to change the properties of the filter in accordance with Equations (3) and (4). Eventually, filter 54 responds to the symbols supplied to it to provide the band rejection notch which removes a substantial amount of the energy from transponder 24 from signals $I_{filt}$ and $Q_{filt}$.

The circuitry included in exemplary processor i of processor 78 for computing the values of $I_k^i$ and $Q_k^i$ in accordance with Equations (7) and (8) is illustrated in FIG. 4. Signals $p_k^i$ and $q_k^i$ derived at time (k) from stage (i) of shift registers 70 and 72 are supplied to digital multipliers 84, 86, 88 and 90 such that multipliers 84 and 86 are responsive to the $p_k^i$ signal while multipliers 88 and 90 are responsive to the $q_k^i$ signal. The real and imaginary error components $Re(e)_k$ and $Im(e)_k$ at time (k), respectively derived from summing circuits 60 and 62, are multiplied by scale factor (d) in multipliers 92 and 94. The resulting product representing signals derived from multipliers 92 and 94 are supplied to multipliers 84–90, such that multipliers 84 and 90 respond to the output of multiplier 92 and multipliers 86 and 88 respond to the output of multiplier 94. Output signals of multipliers 84 and 88 are linearly combined in summing circuit 96, having a digital output signal representing the sum of the outputs of these multipliers in accordance with.

$$p_k^i dRe(e)_k + q_k^i dIm(e)_k \qquad (9).$$

The output of summing circuit 96 is applied to accumulator 98, which adds the most recent output of summing circuit 96 to the sum of prior outputs of circuit 96 to thereby function as an integrator for successive outputs of the summing circuit. The output signals of multipliers 86 and 90 are combined in summing circuit 99, having positive and negative input terminals respectively responsive to the outputs of multipliers 86 and 90. Summing circuit 99 thereby derives a digital output signal representing:

$$p_k^i dIM(e)_k - q_k^i dRe(e)_k \qquad (10).$$

The output of summing circuit 99 is applied to accumulator 100, constructed the same as accumulator 98. At time (k) accumulators 98 and 100 derive digital output signals representing the coefficients $Re(coeff)_{k+i}$ and $Im(coeff)_{k+i}$ in accordance with Equations (5) and (6). The output signals of accumulators 98 and 100 are respectively combined in multipliers 102 and 104 with signals $p_k^i$ and $q_k^i$ in multipliers 106 and 108 with the output signals of accumulators 98 and 100. The resulting product signals derived from multipliers 102 and 104 are combined in adding circuit 110, having positive and negative inputs respectively responsive to the outputs of multipliers 102 and 104. The output signals of multipliers 106 and 108 are combined in summing circuit 112, having two positive inputs. Thereby, summing circuits 110 and 112 respectively derive output signals $I_{filtk}^i$ and $Q_{filtk}^i$ in accordance with:

$$I_{filtk}^i = p_k^i Re(coeffi)_k - q_k^i Im(coeffi)_k \qquad (11)$$

$$Q_{filtk}^i = q_k^i Re(coeffi)_k + p_k^1 Im(coeffi)_k \qquad (12).$$

The digital signal values derived from summing circuits 110 and 112 in each of seven processors 78.0–78.6, i.e., for all of i=0–6, are added together in summing circuits 80 and 82, FIG. 3, to derive the digital output signals $I_{filt}$ and $Q_{filt}$ of filter 54.

The $I_{filt}$ and $Q_{filt}$ output signals are close in value to the value of the symbol received four symbols prior to the output of the filter being derived, i.e., when that input symbol is in the center stage of shift registers 70 and 72. In general, for a shift register having N stages, the output of filter 54 including such an N stage shift register is approximately equal in magnitude to the input of the filter [(N−1)/2]+1 symbol periods previously.

It is not necessary, in all instances, for multibit digital signals to be employed. In many instances, satisfactory results can be provided by responding only to a reduced number of resolution or dynamic range bits resulting from the error signals and the samples supplied to filter 54. In the preferred, described embodiment, the signal at each tap of the delay lines formed by shift registers 70 and 72 is updated in response to each symbol derived from samplers 50 and 52. It is not necessary, however, for the updating to be this frequent and it is possible to update the same tap of the delay lines formed by shift registers 70 and 72 several symbols in a row by supplying the same output of the samplers to the filter for several symbols.

For quadrature phase shift key (QPSK) modulation, $I_{est}$ and $Q_{est}$ are the outputs of digital derotator 58, FIG. 2, as disclosed in U.S. Pat. No. 5,438,590. It is not necessary for the circuitry for deriving the estimates $I_{est}$ and $Q_{est}$ for QPSK modulation to be as complex as disclosed in U.S. Pat. No. 5,438,590. The estimates of $I_{est}$ and $Q_{est}$ can be made by determining the quadrant in which the $I_{filt}$ and $Q_{filt}$ output signals of filter 54 are located. The quadrant determination can be based exclusively on the polarity of the values of $I_{filt}$ and $Q_{filt}$ as follows:

TABLE I

| Quadrant of $I_{filt}$, $Q_{filt}$ | $I_{est}$ | $Q_{est}$ |
| --- | --- | --- |
| 1st, i.e. $I_{filt}$ and $Q_{filt}$ are both + | +1 | +1 |
| 2nd, i.e. $I_{filt}$ is −, $Q_{filt}$ is + | −1 | +1 |
| 3rd, i.e. $I_{filt}$ and $Q_{filt}$ are both − | −1 | −1 |
| 4th, i.e. $I_{filt}$ is +, $Q_{filt}$ is − | +1 | +1 |

Table I can also be employed to derive values for $I_{est}$ and $Q_{est}$ for quadrature amplitude modulation (QAM) signals.

The apparatus of FIGS. 3 and 4 can also be used for signals having bi-phase shift key modulation (BPSK), with appropriate modification of the derotation circuitry. In BPSKS the $Q_{est}$ output of demodulator 52 always has a zero value. The derotation circuitry of demodulator 56 derives the $I_{est}$ values in response to the values of $I_{filt}$ such that for all positive values of $I_{filt}$, $I_{est}$=1 and for all negative values of $I_{filt}$, $I_{est}$=−1. Because of noise in the link to transponder 22 and the interference from transponder 24, the Q channel output of sampler 52 usually has a non-zero value and the quadrature values in filter 54 and the $Q_{filt}$ output of the filter are usually not zero for BPSK. However, the properties of filter 54 and of the derotation circuitry of demodulator 56 tend to cause the characteristics of filter 54 to pass the wide band BPSK spectrum of transponder 22 and to attenuate the narrow band f.m. video spectrum of transponder 24.

It is not necessary to make the decisions as to the values of $I_{filt}$ and $Q_{filt}$ based entirely on the output signals of filter 54. Other information can be utilized, based on the characteristics of the transmitted signals. These characteristics can be detected in output circuit 64, as disclosed in application Ser. No. 08/065,292.

While there has been described and illustrated one specific embodiment of the invention, it will be clear that variations in the details of the embodiment specifically illustrated and described may be made without departing from the true spirit and scope of the invention as defined in the appended claims. In certain instances the outputs of filters 46 and 48 are supplied to variable gain AGC amplifiers responsive to the output of digital demodulator 56, as described in the U.S. Pat. No. 5,438,590.

What is claimed is:

1. A method of discriminating a desired signal having a wide frequency band and including sequential symbols representing digital values, the desired signal being discriminated from a narrow band interfering signal having a carrier frequency in the wide band, the method comprising:

initially applying both of the signals to a filter, wherein said filter includes a delay arrangement, the desired signal being modulated with a variable phase and including at least one channel, the filter being responsive to orthogonal I and Q channels derived in response to reception of the wide and narrow band signals and having I and Q channel outputs, each of the I and Q channels to which the filter is responsive including information about the interfering signal, at least one of the I and Q channels to which the filter is responsive including information about the values of sequential symbols in the desired signal, applying the information and the symbols to the delay arrangement so they are progressively delayed in the elements for intervals determined by the interval between adjacent symbols, combining signals representing (1) the symbols and information in the I and Q channels as delayed for corresponding times with each other and (2) errors between I and Q channel outputs of the filter with estimates of the symbols in the derived signal to derive I and Q output signals for each of several of the delay intervals, combining the I output signals of several of the delay intervals to derive the I channel output of the filter, and combining the Q output signals of several of the delay intervals to derive the Q channel output of the filter, said delay arrangement including first and second delay devices respectively responsive to the I and Q channels and each having (N+1) cascaded stages $0, 1 \ldots i \ldots N$, where N is an even integer, initially setting the signal values for the combined signals representing the combined values of (1) and (2) to a first binary value except that one of the signal values for the combined signals representing the combined values of (1) and (2) is set to a second binary value loading binary zero values in each of the stages except stage, $$\left(\frac{N}{2}+1\right),$$

and initially loading a non-zero finite value in stage, $$\left(\frac{N}{2}+1\right),$$

and (2) the I channel and Q channel filter output signals in accordance with:

$$I_{filtk} = \sum_{i=0}^{n} [p_k^i Re(coeffi)_k - p_k^i Im(coeffi)_k] \text{ and}$$

$$Q_{filtk} = \sum_{i=0}^{n} [q_k^i Re(coeffi)_k - p_k^i Im(coeffi)_k].$$

said applying both of the signals to the filter so that both signals are passed to an output of the filter, responding to the filter output to derive estimates of the values of received symbols of the desired signal, comparing the filter output with the estimated values of the received symbols to derive an error representing signal, and controlling a characteristic of the filter in response to the error representing signal so the filter is adjusted to reject the interfering signal and pass the desired signal.

2. The method of claim 1, wherein the signal value for the I channel output $$\frac{N}{2}+1 \quad \text{or} \quad \frac{N}{2}$$

for the combined values of (1) and (2) is set to the second binary value.

3. A method of discriminating a desired signal having a wide frequency band and including sequential symbols representing digital values, the desired signal being discriminated from a narrow band interfering signal having a carrier frequency in the wide band, the method comprising:

initially applying both of the signals to a filter so both signals are passed to an output of the filter wherein the filter includes a delay arrangement, wherein the delay arrangement includes first and second delay devices respectively responsive to I and Q symbols and each including (N+1) delay taps $0, 1 \ldots i \ldots N$, on which are derived at time k signals $p_k^i$ and $q_k^i$, I and Q errors at time k being respectively represented by $Re(e)_k$ and $Im(e)_k$, the combining step to derive the output signal for each element being performed by combining the $p_k^i$, $q_k^i$, $Re(e)_k$ and $Im(e)_k$ signals as well as a scaling factor d to derive (1) signals representing real and imaginary coefficients in accordance with:

$$Re(coeffi)_{k+1} = Re(coeffi)_k + d[Re(e)_k P_k^i + Im(e)_k q_k^i] \text{ and}$$

$$Im(coeffi)_{k+1} = Im(coeffi)_k + d[Im(e)_k P_k^i - Re(e)_k q_k^i],$$

and (2) the I channel and Q channel filter output signals in accordance with:

$$I_{filtk} = \sum_{i=0}^{n} [p_k^i Re(coeffi)_k - p_k^i Im(coeffi)_k] \text{ and}$$

$$Q_{filtk} = \sum_{i=0}^{n} [q_k^i Re(coeffi)_k - p_k^i Im(coeffi)_k],$$

the desired signal being modulated with a variable phase and including at least one channel, the filter being responsive to orthogonal I and Q channels derived in response to reception of the wide and narrow bank signals and having I and Q channel outputs, each of the I and Q channels to which the filter is responsive including information about the values of sequential symbols in the desired signal, applying the information and the symbols to the delay arrangement so they are progressively delayed in the elements of intervals determined by the interval between adjacent symbols, combining signals representing (1) the symbols and information in the I and Q channels as delayed for corresponding times with each other and (2) errors between I and Q channel outputs of the filter with estimates of the emitted symbols in the derived signal to derive I and Q output signals for each of several of the delay intervals, combining the I output signals of several of the delay intervals to derive the I channel output of the filter, and combining the Q output signals of several of the delay intervals to derive the Q channel output of the filter responding to the filter output to derive estimates of the values of received symbols of the desired signal;

comparing the filter output with the estimated values of the received symbols to derive an error representing signal; and controlling a characteristic of the filter in response to the error representing signal so the filter is adjusted to reject the interfering signal and pass the desired signal.

4. Apparatus for receiving wideband emissions from a first geosynchronous satellite in the presence of a narrow band emission from a second geosynchronous satellite having a relatively close arcuate spacing from the first satellite, the wide band and narrow band emissions being capable of having overlapping spectra such that the narrow band can have a carrier frequency that is variable in the spectrum of the wide band, comprising:

an antenna having a beamwidth such that emissions from the first and second satellites are respectively transduced into first and second simultaneously occurring electrical signals having amplitudes with the same order of magnitude, and an adaptive filter, wherein the filter is operated in response to the first and second signals so it passes most frequencies in the bandwidth of the first signal and attenuates substantially all frequencies in the bandwidth of the second signal, the adaptive filter being responsive to the first and second electrical signals for attenuating substantially the second signal relative to the first signal so the first signal as coupled to an output terminal of the filter has an amplitude that can produce a perceptible response in an output device and the second signal as coupled to the output terminal has an insufficient amplitude to produce a perceptible response in the output device even though the carrier frequency is variable in the wide band and wherein the desired signal includes orthogonal I and Q channels, each including simultaneous sequential I and Q symbols, the filter including a delay arrangement, signals representing the I and Q symbols being applied to the delay arrangement so signals representing the I and Q symbols propagate in the delay arrangement so they are progressively delayed for intervals determined by the propagation time interval of adjacent symbols between pairs of the elements, and means for combining signals (1) representing the I and Q symbols as delayed for corresponding times with each other and signals representing I and Q errors to derive I and Q output signals for each of several delay intervals, (2) I output signals of each of the several delay intervals to derive an I channel filter output signal, and (3) Q output signals of each of the several delay intervals to derive a Q channel filter output signal wherein the delay arrangement includes first and second delay devices respectively responsive to the I and Q symbols and each including (N+1) delay taps 0,1 ... i ... N, on which are derived at time k signals $p_k^i$ and $q_k^i$, the I and Q errors at time k being respectively represented by $Re(e)_k$ and $Im(e)_k$, the combining means responding to the $p_k^i$, $q_k^i$, $Re(e)_k$ and $Im(e)_k$ signals as well as a scaling factor d for (1) deriving signals representing real and imaginary coefficients in accordance with:

$$Re(coeffi)_{k+1}=Re(coeffi)_k+d[Re(e)_k P_k^i+Im(e)_k q_k^i] \text{ and } Im(coeffi)_{k+1}=Im(coeffi)_k+d[Im(e)_k P_k^i-Re(e)_k q_k^i], \text{ and}$$

(2) the I channel and Q channel filter output signals in accordance with:

$$I_{filtk} = \sum_{i=0}^{n} [p_k^i Re(coeffi)_k - p_k^i Im(coeffi)_k] \text{ and}$$

$$Q_{filtk} = \sum_{i=0}^{n} [q_k^i Re(coeffi)_k - p_k^i Im(coeffi)_k].$$

5. The apparatus of claim 4, wherein the estimates of the emitted symbols are derived by determining the quadrant of the I and Q channel filter output signals such that predetermined combinations of the values of the estimates of the emitted symbols for the I and Q channels are derived depending on the values of the I and Q channel filter output signals.

* * * * *